Patented Oct. 16, 1928.

1,688,127

UNITED STATES PATENT OFFICE.

NIKOLAUS MEURER, OF BERLIN-NEU-TEMPELHOF, GERMANY, ASSIGNOR TO METALLOGEN GESELLSCHAFT MIT BESCHRANKTER HAFTUNG, OF BERLIN-NEUKOLLN, GERMANY.

PROCESS FOR IMPREGNATING METAL LAYERS.

No Drawing. Application filed December 20, 1922, Serial No. 608,126, and in Germany January 28, 1922.

When metallic coatings or other metallic layers are produced by spraying metal, which is fluid or only heated, or metal vaporized by condensation and are not consolidated by mechanical or thermal intermediate or subsequent treatment, they are permeated by microscopically small pores, which in many respects affect the properties required of such layers.

According to my present invention the texture of such layers formed by sprayed, squirted or vaporized metal is treated during or subsequent to their formation with fillers of such a nature that, when in the pores of the metallic layers, they either resist most chemical action in general or more particularly at least the action of acids, lyes, vapours and the like, to which the layers are liable to be exposed subsequently. Such fillers may be of the most varied kind, and be introduced into the texture of the metallic layers in many different ways. They may consist, for instance, of substances in powder-form, such as cement, gypsum, lime or other materials, which with water or other liquids form thin mixtures or solutions and, after evaporation, fixing or combining, or abstraction of the moisture contained therein, remain in the pores of the metallic texture in a hardened state, completely filling and sealing the pores. They may further consist of lacs, fatty substances, bituminous matter, and the like, which pass either similarly to the substances mentioned above, after a certain time, or, under the action of heat, from the fluid or semi-fluid to a hard, solid state or form with the metal. into the pores of which they penetrate, insoluble salts or deposits, which act in a filling, cementing and sealing manner. This latter formation of salts or deposits may also be effected by the successive penetration of a number of different substances, which enter into a definite chemical action or reaction with each other. This can be readily effected, for instance by the first chemical solution pentrating into the pores of the metallic layer and being sucked up and retained by them, whereupon the second solution, which is for instance squirted into the metallic layer or penetrates forcibly into the pores by the application of pressure and cold, forms a deposit with the first solution in the same. As an example for this may be mentioned the formation of barium sulphate from barium chloride and any sulphate. In applying such methods the endeavour will be to produce deposits, which are finely crystalline or as amorphous as possible and to obtain them in colloidal form. For the rest the production of such deposits is too well known to require discussion in this connection.

The introduction of the fillers or of the fluid or semi-fluid mixtures or solutions containing or producing them into the pores of the metallic layers may be effected by squirting, rubbing, brushing or immersing the articles to be coated during or after the production of the squirted metallic layer. Preferably the articles to be coated are heated before the fillers are introduced so as to enlarge the pores and to cause the air in them partly to escape from the pores. On the filler being thereupon rubbed into the heated layers and the article being caused to cool rapidly, the fillers will be actually sucked into the pores. Preferably this process is repeated several times and it is also recommended to apply it not after the squirted or vaporized metallic application has been completed, but during its production in the preliminary stages. in which its has not yet reached its final thickness. The pores lying deep down in the metallic layer would with a merely superficial treatment of the finished layer be filled with air to such an extent that the rarefaction of the latter by heating and the treament of the article with fillers, while it is being cooled, would result in the fillers being deposited only superficially or reaching only a short way into the pores. If on the other hand, the treatment of the articles to be coated with consolidating fluids be carried out during the production of the squirted metallic layer, the air in the pores as they are being formed is already heated and rarefied by the heating of the article, while being coated, by the melting flame of the squirting apparatus and contracts at the moment of contact of the article with the cold fillers, so that it draws the fillers into the pores.

From the wide choice offered by chemistry for the production of insoluble substances, the most useful may be selected, i. e., as far as possible those deposits that do not contain water of crystallization, but especially those that are not sensitive to acids and lyes or to the substances, to the action of which the metallic layers will be subsequently exposed.

In many cases it will be advisable to use neutral solutions in place of acid ones and in some cases it will be necessary to use alkaline solutions instead of acid or neutral ones, in order to prevent the formation of rust or corrosion before, during or after the forming of the insoluble coating medium.

Instead of filling the pores of the metallic layers formed by spraying, squirting or vaporization with nonmetallic substances, they may be lined with such metallic masses as are not obtained by way of the metal squirting process.

It has already been proposed to make metallic coatings by letting a deposit form on the metallic article to be coated by contact action only, without the use of an external source of current and without fusion or smelting. In practice these methods have only acquired a quite limited importance, as they all give only exceedingly thin layers of insufficient mechanical resistance. By the combination of these methods with the metallic layers formed by the squirting process, however, the texture of the latter may be considerably consolidated and improved by the metallic deposits formed in the pores by the contact process.

This combination may be effected by first one and then the other process being applied or both several times in succession or simultaneously or alternately on the same article.

By the contact process it is possible to cause all metals of higher electrolytic tension of solution such as zinc, tin, iron and the like to separate from the solutions of other metals (so called precious metals) which have a weaker electrolytic tension of solution. When this takes place in solutions of certain composition and of suitable concentration, this separating off of a metal often occurs in a continuous adhesive layer on the metal, which is for instance immersed. The procedure is similar if the metal of lower electrolytic tension of solution is applied in a suitable combination in a pasty, semi-fluid or spreadable form on a metal of higher tension of solution, the concentration of ions in the solution, paste, semi-fluid or spreadable mass playing a decisive part as regards the separability of the metal.

With some less electro-positive metals the mere immersion in a solution or contact with a suitable combined pasty, semi-fluid or spreadable mass or spreadable fluid will not cause metal to separate. Such a separation can, however, be caused to take place, as is well known, if the metal be brought into contact with a metal, which is stronger electropositively, such as zinc, aluminium, iron or the like, the potential differences of these metals being added together and the resulting electric current enabling the metal to separate off as a metal deposit on the less positive metal. It is known, that in a solution of copper potassium tartrate, for instance zinc will become coppered directly, iron only when brought into contact with zinc, and brass not directly in a solution of copper sulphate, but when brought into contact with zinc or iron. On the above mentioned addition of the potential differences are based the actual processes for making coatings by contact in the restricted sense, which must not be confused with the metallic coatings of the kind already alluded to, which are made by what are sometimes erroneously called contact processes, consisting in merely immersing in, or rubbing, coating, brushing or squirting on a single kind of metal without the use of any special contact medium, in which there is physico-chemical or electrical action and in which, just as in the contact process proper, no external source of current is employed.

Finally another way of producing metallic coatings is known, in which there is a direct depositing of the metal on another metal or an alloying of the two metals also by mere contact without the employment of electrolytes and without the coating material having first to be made specially fluid or converted into vapour, viz, amalgamation, i. e. the production of combinations with mercury.

A great number of separate recipes have been proposed for the production of metallic coatings by all the above methods, in the making of which no external source of current, fusing or smelting of the coating metal is employed, and which, according to the way they are made, i. e according as they are produced by immersion, boiling, rubbing, painting or squirting with or without the use of a contact medium, are generally termed immersion, boiling saturating, rubbing, painting or contact processes.

If for example a squirted metallic layer, for instance zinc, be immersed in a solution of a metallic salt, for instance copper-vitriol, which is suitable for causing the metal, for instance copper, to separate off by the contact process, owing to the loose texture, the pores and fissures, the layers formed by the squirting process will permit of a considerable increase in the separation of the metallic deposits that can be produced, directly on smooth metal surface, since the metallic deposits are formed, not only on the surface, but penetrate deeply into the interior of these porous metallic skins, up to the part in contact with the article to be coated, filling up fissures and thereby causing a sort of gluing effect.

Thus, by this manner of combining the two metallizing processes, there is not only a superposition or addition of metallic layers that are capable of being made separately, but an intermingling, an increase in the density and the strength, while the structure and properties of the two separate metallizing methods due to the manner of forming the layers are utilized to the best advantage. The coating is however rendered almost impervious or entirely so chiefly by the peculiar protective action due to this intermingling of the layers.

The thinness of layer of the metallic coatings made by the contact process, which has been regarded as a disadvantage, offers in combination with the metal squirting process, the further advantage, that the general form of the external surface, for instance rough surface of the articles to be coated or of the metal, which has been squirted on, retains its structure. Should, for instance, the deposits of the contact process not sink into the pores, but only remain on the top and equalize or smooth the rough surface, a subsequent application or a further coating of metal by the squirting process would not be able to provide an adhering metallic layer, for in this process it is essential that the surface to be coated shall be rough. Since, however, the metallic deposits made by the contact process are sufficiently thin not to affect unfavorably the form of the articles, on which they separate off, it is possible to repeat the combination of processes suggested by the invention in any sequence and with entirely different metals or alternately with the same metals on the same article and thereby to enhance the favourable effects obtained by the combination of the two processes.

Finally, there is another use, to which the combination of the two processes is applicable, viz., the easy way of obtaining by means of the combination metallic layers or intermediate carriers for the purpose of forming alloys or of increasing the adhesion. Experience has shown that for instance certain squirted kinds of metal can hardly be made to adhere securely, or only with the greatest difficulty and expense, on certain other metals, e. g. tin or cast iron. When employing the combination described, however, a quite simple process is provided for applying the intermediate carriers, as most contact processes can be carried out without any further or at least any considerable expenditure of energy and cost.

Having now particularly described and ascertained the nature of my said invention and in what manner the same is to be performed, I declare that what I claim is:

The process for forming a composite metal surface comprised of two or more layers of one or more kinds of metal involving the steps of applying a layer of metal by spraying fluid metal or depositing vaporized metal, then closing the pores of such layer by treating it at different time intervals with solutions of various substance, whereby the substance of one solution upon contact with the substance of the prior solution in the pores of the metal will chemically react to form a third substance in the pores of the metal and be retained therein as a precipitate, then applying further layers of metal to the surface of the layer, the pores of which have been treated, and repeating the process of closing the pores of each layer directly after it has been applied.

In witness whereof I hereunto set my hand.

NIKOLAUS MEURER.